United States Patent
Surel

[11] 3,724,100
[45] Apr. 3, 1973

[54] TALKING BOOK
[76] Inventor: Emile G. Surel, 6 Briglam Lane, Medway, Mass. 02053
[22] Filed: Jan. 25, 1971
[21] Appl. No.: 109,247

[52] U.S. Cl..............................35/35 C, 179/100.2 T
[51] Int. Cl...............................................G09b 5/06
[58] Field of Search..........35/35 C, 8 A; 179/100.2 T

[56] References Cited
UNITED STATES PATENTS

| 3,659,357 | 5/1972  | Martinesco et al. | 35/35 C |
| 3,609,885 | 10/1971 | Bram              | 35/35 C |
| 3,307,274 | 3/1967  | Glaser            | 35/35 C |

Primary Examiner—Wm. H. Grieb
Attorney—Robert T. Palmer

[57] ABSTRACT

A talking book has pages with spaced-apart lines of recordings of the sounds of words. A slide is arranged to be movable by hand over the lines. Near one end of each line is the recorded word of that line written in one language, for example, English, and near the other end of that line is the recorded word of that line written in another language, for example, French. The slide has windows through which the written word can be seen. A motor driven pick-up head is supported by the slide, and is movable by the motor when the latter is started, over and along the length of a recorded line. The pick-up head contains a scanner for producing electrical currents of audio frequency corresponding to the recordings, which currents are amplified and converted into sound.

8 Claims, 7 Drawing Figures 3,724,100

TALKING BOOK

BACKGROUND OF THE INVENTION

For teaching the pronunciation of the words of a language, it has been the practice in the past to record the sound of the words on a tape or a phonograph record, and then to scan the recordings to convert the latter into audio frequency currents which are amplified and converted into sound. With such methods it is impossible to reproduce the sound of a selected individual word. The present invention is the sound reproducing equivalent of a foreign language dictionary in that individual words can easily be selected and their pronunciation produced.

SUMMARY OF THE INVENTION

A frame contains a book, preferably a loose-leaf book, and which is hinged to be folded over the folded book for ease of storage and transportation. The pages of the book have on opposite sides thereof lines of recordings of the sounds of words the pronunciation of which is to be learned, each line preferably containing the recording of the sound of one word. A slide is supported within the frame, and is arranged to be moved by hand over a selected line of recordings. Each line has near its beginning the recorded word written in a reference language which may be English, and near its end the recorded word written in a language the pronunciation of words of which is to be learned. The slide has windows through which the written words can be seen when the slide is in its proper position over a recorded line. A motor-driven pick-up head is supported by the slide, and normally, when the slide is positioned over a selected line, is located between the beginning and end of that line. The pick-up head is conventional and contains a source for projecting light onto a recorded line, and a photo diode for changing reflected light into audio currents which are amplified and converted into sound. When a hand operated, electric switch is closed, the motor drives the head rearwardly over the beginning of a recorded line, then drives the head forwardly to the end of that line, and then drives the head rearwardly to its normal parking position where a limit switch stops the motor. During the rearward movement of the head a switch is automatically opened to deenergize the light source within the head, that switch being automatically closed during the forward movement of the head. The time required for the head to move rearwardly from its normal rest position to the beginning of a recorded line enables the motor to come up to speed before the start of the scanning of a recorded line.

DESCRIPTION OF THE PREFERRED EMBODIMENT

Figure 1:
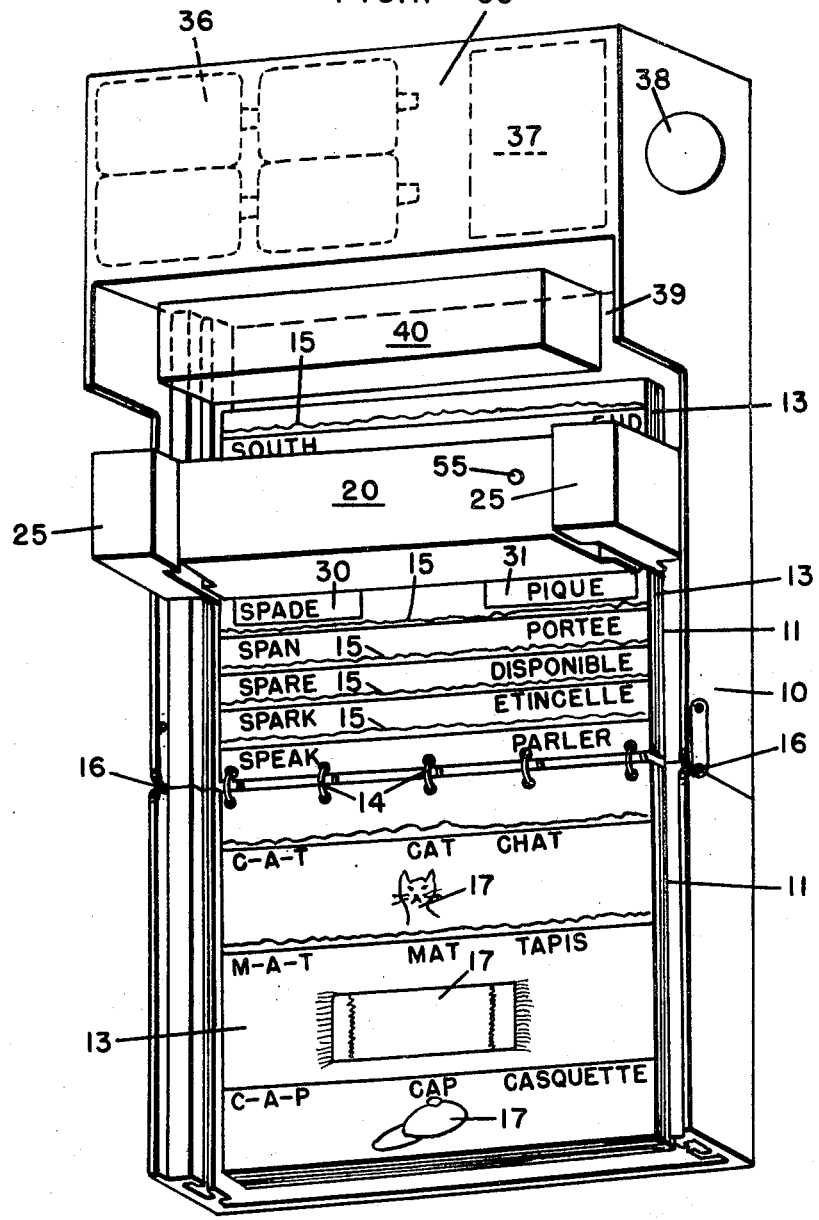
FIG. 1 is a projected view of the book and frame in their open positions, with the slide over one of the recorded lines.
Figure 2:
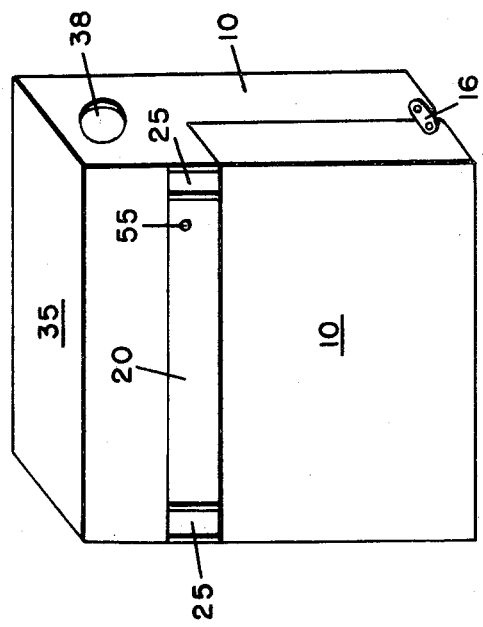
FIG. 2 is a projected view on a reduced scale of the book and frame in their closed positions.
Figure 3:
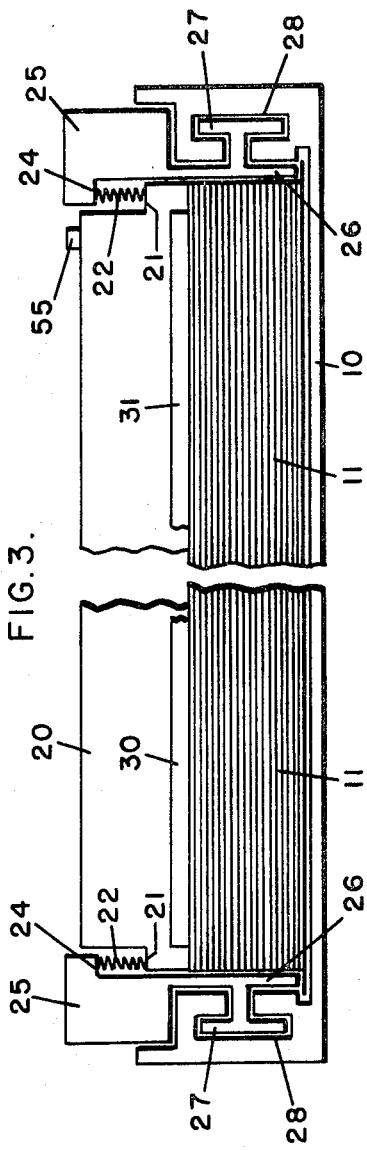
FIG. 3 is a view looking upwardly from the bottom of FIG. 1.

Referring first to FIGS. 1–3 of the drawings, a frame 10 contains a loose-leaf book 11 having pages 13, the inner ends of which are connected by rings 14. The frame 10 has hinges 16 aligned with the rings 14. The frame 10 and the book 11 are adapted to be opened and closed about the hinges 16 and the rings 14 respectively. FIG. 1 shows the frame 10 and book 11 open, and FIG. 2 shows them closed. With the book 11 open as shown by FIG. 1, the facing surfaces of the upper pages, those above the rings 14, have spaced apart lines 15 of recorded sounds of individual words, the respective words being written in English below and to the left of the respective lines, and written in French below and to the right of the respective lines. For simplifying the drawings, only the outlines of the recordings are shown. The facing surfaces of the lower pages 13 have similar recorded lines 15 except that they are spaced further apart, and that in addition to the written words, there are pictures 17 of the objects identified by the words. The back surfaces of the upper pages 13 have recorded lines, written words, and pictures as do the front or facing surfaces of the lower pages 13, and the back surfaces of the lower pages 13 have recorded lines and written words as do the front or facing surfaces of the upper pages 13 so that succeeding pages as they are turned, provide recorded sounds of additional words.

A slide 20 has shoulders 21 near the bottoms of its transverse ends, on which rest the bottoms of coiled springs 22. The tops of the springs 22 contact shoulders 24 of slide support members 25. The latter have lower portions 26 of reduced width from which extend outwardly guide portions 27 within slots 28 in the frame 10. The slide assembly thus is slidably supported by the frame 10.

The springs 22 connect the slide 20 to the slide portions 25, and bias the slide 20 which has an open bottom, downwardly so that its bottom contacts the upper surface of the page 13 which is directly under it so that as the pages are turned, and the number of pages below the slide decrease, the bottom of the slide always is in contact with the upper surface of the page directly under it. Attached to the slide 20 are windows 30 and 31 through which are seen an English word and the corresponding French word respectively.

The frame 10 has at its top a compartment 35 containing batteries 36, an amplifier 37, and a loudspeaker 38. Between the compartment 35 and the tops of the upper pages 13 is a parking space 39 for the slide assembly 20–25.

The space 39 has a block 40 on which the slide assembly rests when it is parked in the space 39.

Figure 5:
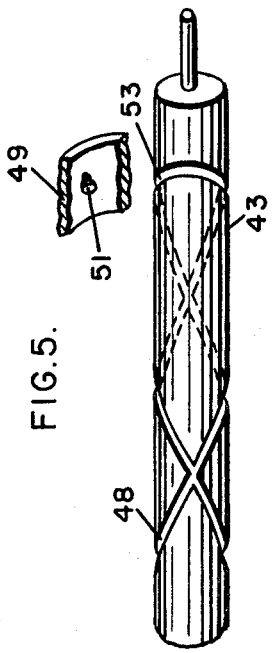
FIG. 5 is an enlarged, exploded, projected view of a portion of the threaded rod, and of the sleeve around the latter.
Figure 4:
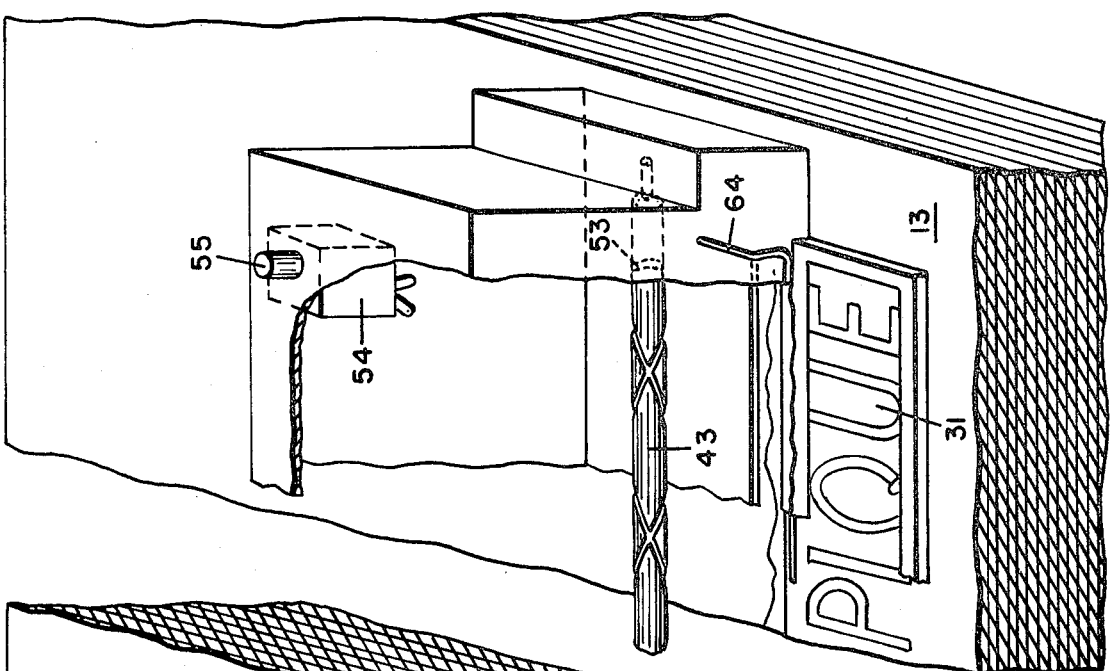
FIG. 4 is an enlarged, fragmentary, projected view of the slide in its normal or rest position, with a portion of one of its walls removed to show in solid lines portions of the motor, the spirally threaded rod driven by the motor, and the start switch, the remainders of the above, and the drive mechanism connecting the motor to the rod being shown by dashed lines, and to show in solid lines the pick-up head, the stop switch, the lamp control switch, the actuating levers of the latter, and a portion of the rod connecting the levers, a portion of one of the lines to be scanned being shown, one of the windows of the slide and a word seen through it being shown, and a portion of the other window and a portion of a word seen through it being shown.
Figure 4:
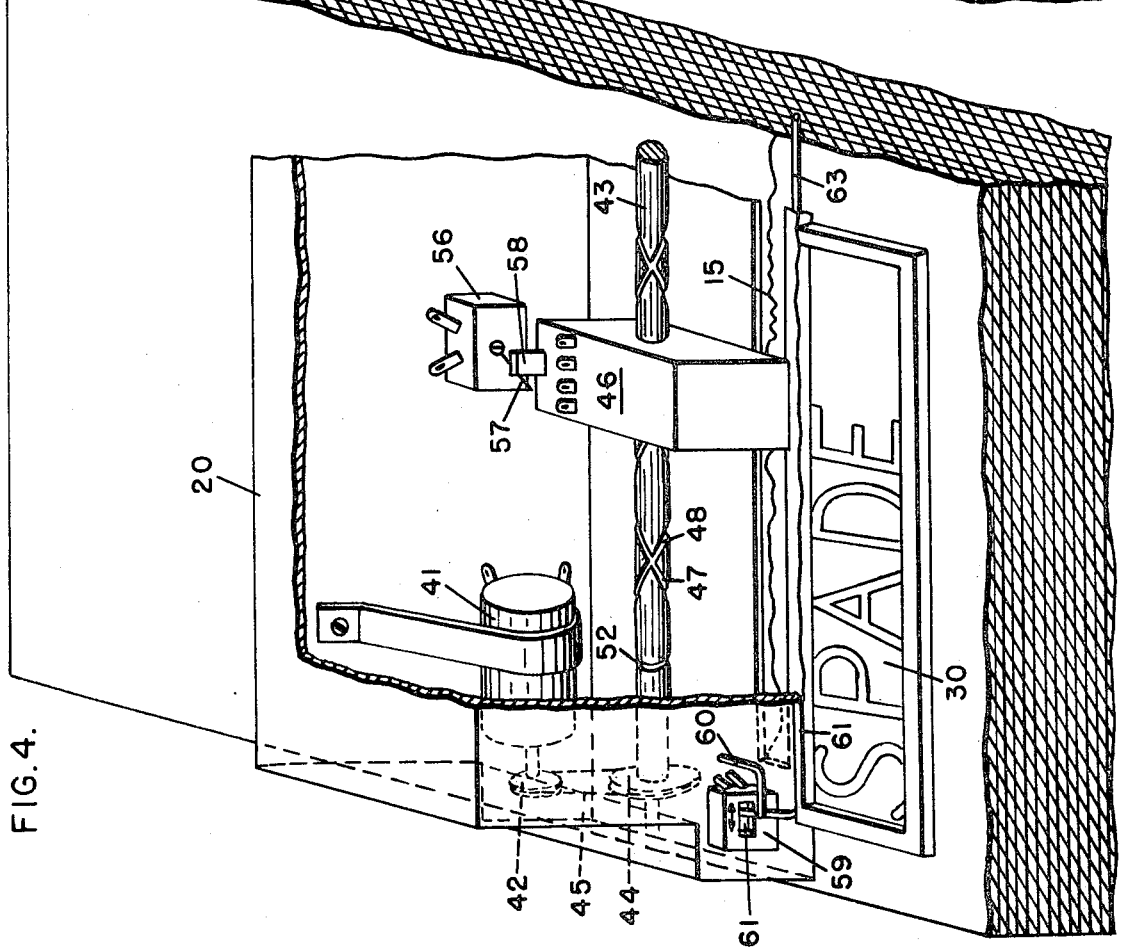
Figure 6:
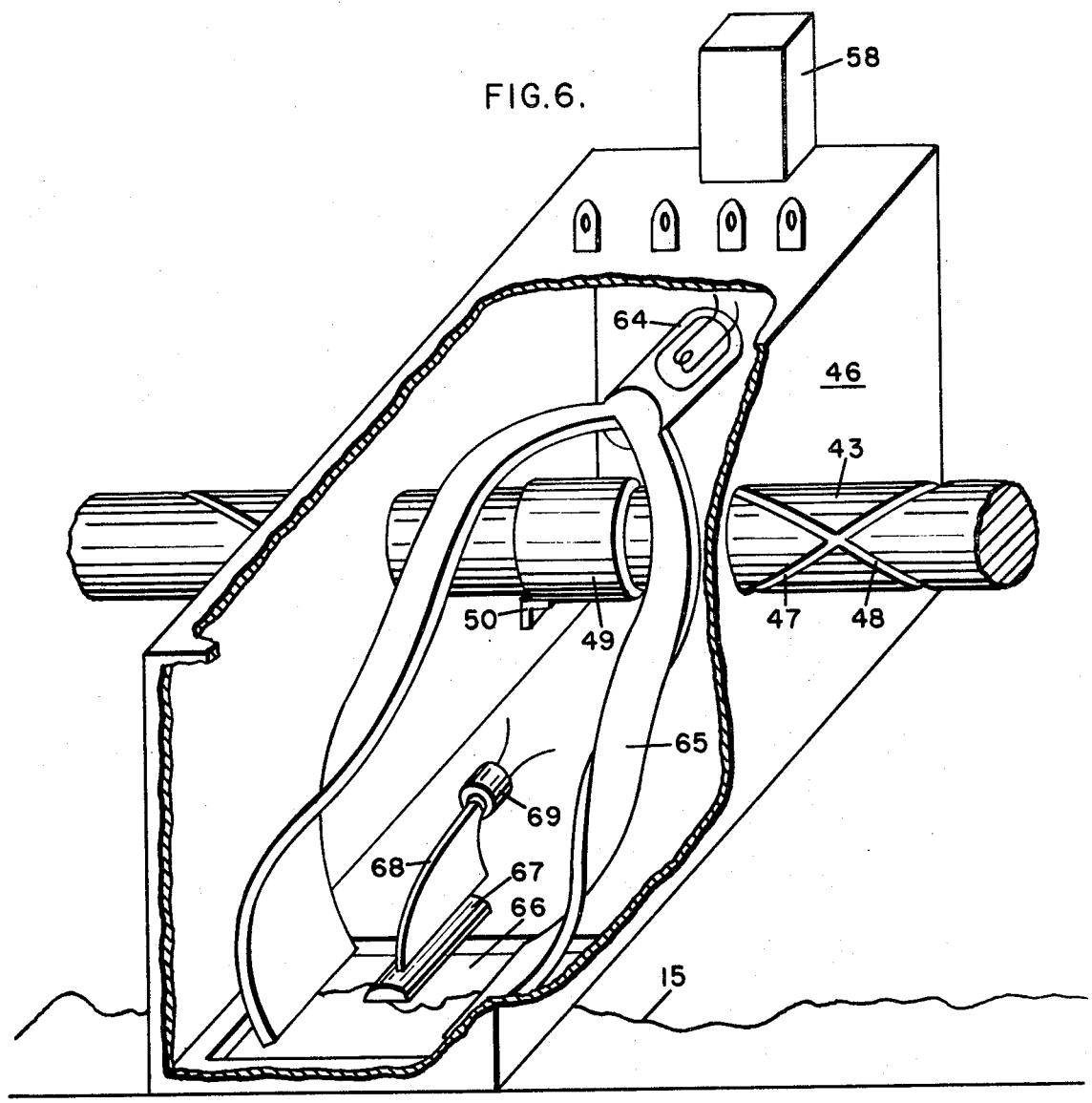
FIG. 6 is an enlarged, projected view of the pick-up head with portions of its walls removed to show its lamp and photo-diode assembly, and to show a portion of the threaded rod, and the sleeve around the rod attached to a wall of the head.

The slide end portions 25 are omitted from FIG. 4. Referring now to FIGS. 4, 5 and 6, the slide 20 contains an electric motor 41 having a pulley 42 on its shaft. A spiral threaded rod 43 has its ends journalled within the slide 20, and has a pulley 44 aligned with the pulley 42. The pulleys 42 and 44 have a belt 45 therearound. The slide 20 contains a pick-up head 46 through which the rod 43 extends. The rod 43 has therein a pair of spiral slots 47 and 48 around which extends a sleeve 49 attached at 50 to a wall of the head 46. The sleeve 49 has an inwardly extending finger 51 which extends into one of the slots 47 or 48 when the head 46 is to be moved forwardly, and extends into the other one of the slots 48 or 47 when the head is to be moved rearwardly. The ends of the slots 47 and 48 are connected by loop slots 52 and 53 so that at the end of one of the slots 47 or 48, the finger 51 moves into the other one of the slots 48 or 47, and at the opposite end of one of the slots 48 or 47, the finger 51 moves into the other one of the slots 47 or 48 for reversing in each case the direction of movement of the head 46. This drive and reversing arrangement is well known and in common use.

A start switch 54 within the slide 20 has a pushbutton 55 extending through the top wall of the slide. A conventional toggle switch 56, a start-stop switch, is within the slide 20, and has a switch actuating lever 57 normally, when the head is in its rest position, in contact with stub 58 on top of the head. The switch 56 is spring-biased towards closed position so that when the head 46 starts to move rearwardly (to the left with respect to FIG. 4 ), the lever 57 rides off the stub 58, and the switch 56 closes. When the stub 58 moves to the right against the lever 57 during forward movement of the head 46, the lever 57 moves but does not open the switch 56 which is not opened until the stub 58 again moves to the left against the lever 57 when the head 46 again reaches its rest position. Within the slide 20 near its left end is a conventional toggle switch 59 having an actuating lever 60 connected by lever 61 to the interior of the switch 59. The lever 61 is connected by rod 63 to lever 64 near the opposite end of the slide 20. The switch 59 is normally open; is closed by the contact of the head 46 against the lever 60 when the head moves to the extreme left, and is opened by movement of the head against the lever 64 when the head moves to the extreme right.

Referring now to FIG. 6, the head 46 contains a light bulb 64 which, when energized, projects light within enclosure 65 of fiber optic and opening 66 in the bottom of the head 46 against the surface of a recording 15, the light reflected from that surface passing through lens 67, and sheet 68 of fiber optic against photo-diode 69. This scanning arrangement is conventional.

Figure 7:
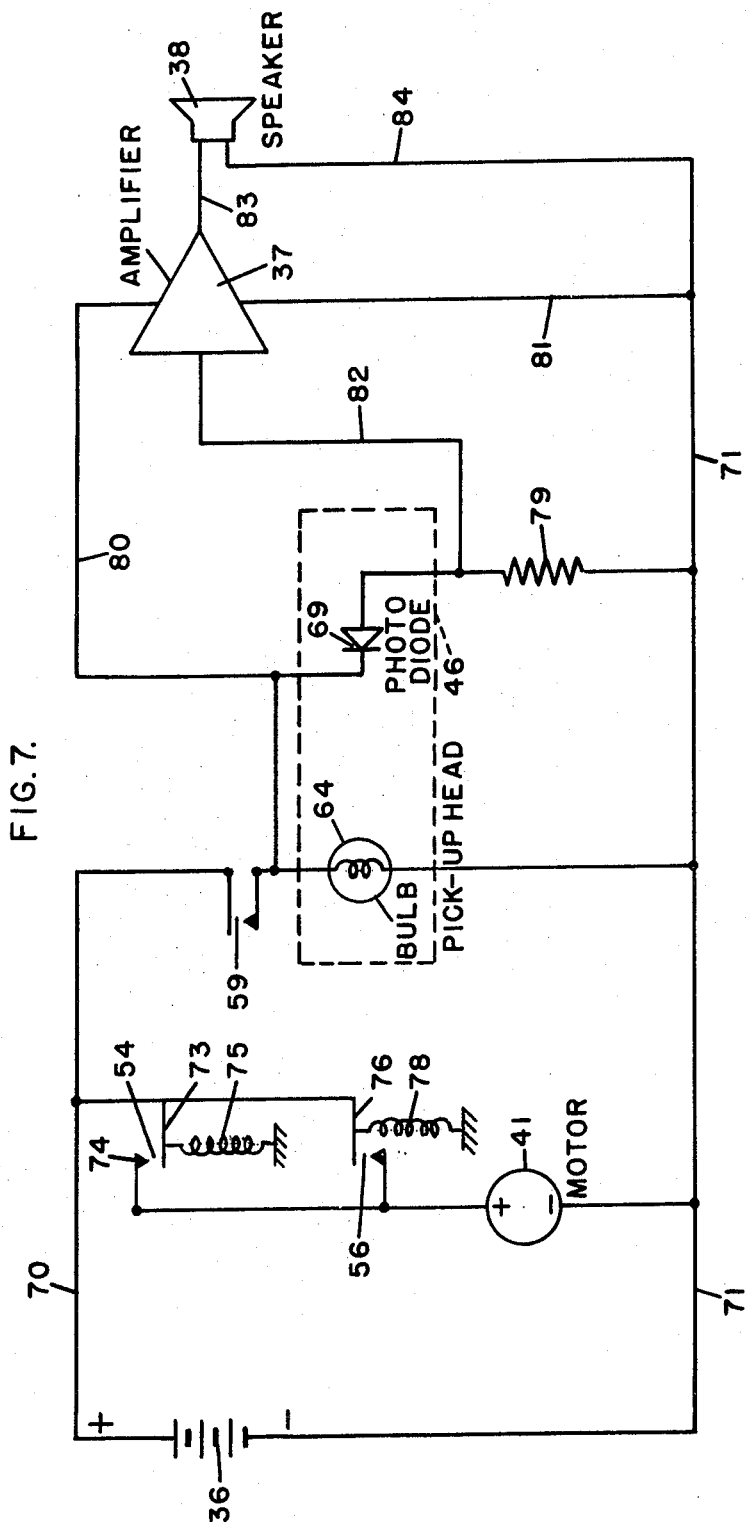
FIG. 7 is a simplified circuit schematic showing the connections of the electrical components.

Referring now to FIG. 7, the series-connected batteries 36 are connected by wires 70 and 71 and parallel-connected, normally open switch 54 and 56 to the motor 41. Movable contact arm 73 of the switch 54 is biased by spring 75 away from the fixed contact arm 74 of the switch 54 for biasing the latter towards open position. Movable contact arm 76 of the switch 56 is biased by the spring 78 towards the fixed contact arm of the switch 56 for biasing the latter towards closed position. The light bulb 64 of the pick-up head 46 is connected in series with the normally open switch 59 to the wires 70 and 71. The photo-diode 69 of the head 46 is connected in series with the switch 59 and resistor 79 to the wires 70 and 71. The amplifier 37 is connected by wires 80 and 81 across the series connection of the photo-diode 69 and the resistor: is connected by the wire 82 to the junction of the photo-diode 69 and the resistor 79, and is connected by wire 83 to the loudspeaker 38 which is connected by wire 84 to the wire 71.

OPERATION

The frame 10 and the book 11 are unfolded from their closed positions shown by FIG. 2 of the drawings, to the unfolded positions shown by FIG. 1 of the drawings. The slide assembly 20–25 is slid by hand from its parking position within the parking space 39 over the page until an underlying respective English and French words are seen through the windows 30 and 31 respectively. The head 46 is in its rest position as shown by FIG. 4 of the drawings, over an intermediate portion of the recorded sound in French in the selected line of recording. To produce the sound in French of the selected word, the pushbutton 55 of the switch 54 is momentarily depressed by hand, closing the switch 54 and starting the motor 41. The latter then rotates the rod 43 to cause the pick-up head 46 to move rearwardly (to the left with respect to FIG. 4), causing the stub 58 to ride over the switch lever 57, permitting the switch 56 to close and to energize the motor 41 after the pushbutton 55 is released. The scanning components within the head 46 are deenergized by the open switch 59 during the rearward movement of the head to prevent the production of spurious sound. The head 46 continues to move rearwardly to just beyond the beginning of the selected recording, and at the end of its rearward movement, the finger 51 of the sleeve 49 moves into the loop slot 52, causing the rotation of the rod 43 to reverse the direction of movement of the head 46 so that it now moves forwardly over the recording from its beginning to its end. When the head 46 reaches the end of its rearward movement, it moves against the switch lever 60 of the switch 59, causing the latter to close, and to energize the components within the head 46 so that during the forward movement of the head, the scanning components are energized, and the sound of the recorded word is produced in french. The switch 59 when closed, also energizes the amplifier 37. The switch 59 remains closed during the forward movement of the head 46, and is opened by the movement of the latter against the switch lever 64 when the head 46 has moved to its extreme forward position.

When the head 46 has moved to its extreme forward position, the finger 51 of the sleeve 49 moves into the loop slot 53, causing the direction of movement of the head 46 to be reversed so that it moves rearwardly until it reaches its rest position where the stub 58 on the head moves against the switch lever 57 causing the switch 56 to open and to stop the motor 41.

I claim:

1. A talking book comprising a frame, a book within said frame, said last mentioned book having pages with spaced-apart lines of recordings of sound on the opposite surfaces thereof, said last mentioned book having means loosely connecting said pages at their inner edges, said lines being substantially parallel to said edges, a slide supported by said frame for slidable movement by hand, in a single pass, over all of the lines of recording on, when said last mentioned book is open with facing surfaces of two adjoining ones of said pages visible, said facing surfaces of both of said adjoining pages, a pick-up head supported by said slide for movement over and along the length of a selected one of said lines, said head having scanning means for translating the modulations of the recording on said selected line into audio currents, means for amplifying said currents and converting the latter into sound, an electric motor, means driven by said motor for moving said head along said length of said selected line, and means including switch means for energizing and deenergizing said motor.

2. A talking book as claimed in claim 1 in which said frame has hinge means aligned with said means loosely connecting said pages so that said frame and said book within said frame can be opened and closed about said hinge means and said loosely connecting said pages respectively.

3. A talking book as claimed in claim 1 in which said head is normally at a rest position when said slide is over said selected line, between the beginning and end of that line, in which said driven means includes means for first moving said head from said rest position rearwardly over the beginning of said selected line, for then moving said head forwardly over the length of that line, and for then moving said head rearwardly back to said rest position, when said motor is energized, and in which said switch means includes a first, hand-operated switch for energizing said motor, and includes a second switch open when said head is at said rest position for deenergizing said motor, and closed when said head has started to move rearwardly from said rest position for energizing said motor.

4. A talking book as claimed in claim 3 in which said frame has hinge means aligned with said means loosely connecting said pages so that said frame and said book within said frame can be opened and closed about said hinge means and said means loosely connecting said pages respectively.

5. A talking book as claimed in claim 4 in which said frame has a parking space for said slide to one side of said book within said frame, out of alignment with said pages.

6. A talking book as claimed in claim 2 in which said frame has a parking space for said slide to one side of said book within said frame, out of alignment with said pages.

7. A device for pronouncing the sounds of words comprising a frame, a book within said frame, said book having pages with spaced-apart lines of recordings of sounds of words thereon, a slide supported by said frame for slidable movement by hand over the lines of recording on the facing surface of one of said pages when said book is open, a pick-up head supported by said slide for movement over and along the length of a selected one of said lines, said head having scanning means for translating the modulation of the recording on said selected line into audio currents, means for amplifying said currents and converting the latter into sound, an electric motor, means driven by said motor for moving said head along the length of said selected line, and means including switch means for energizing and deenergizing said motor, said head being normally at a rest position when said head is over said selected line, between the beginning and end of that line, said driven means including means for first moving said head from said rest position rearwardly over the beginning of said selected line, for then moving said head forwardly over the length of that line, and then moving said head rearwardly back to said rest position when said motor is energized, said switch means including a first, hand-operated switch for energizing said motor, and including a second switch open when said head is at said rest position for deenergizing said motor, and closed when said head has started to move rearwardly from said rest position for energizing said motor.

8. A device as claimed in claim 7 in which said book has means connecting the inner edges of said pages, and in which said frame has hinge means aligned with said last mentioned means so that said book and said frame can be opened and closed about said last mentioned means and said hinge means respectively.

* * * * *